United States Patent [19]

Brady

[11] 3,775,637

[45] Nov. 27, 1973

[54] CATHODE RAY DISPLAY INTENSITY CONTROL CIRCUIT

[75] Inventor: Thomas Joseph Brady, Haddonfield, N.J.

[73] Assignee: RCA Corporation, New York, N.Y.

[22] Filed: Sept. 15, 1971

[21] Appl. No.: 180,725

[52] U.S. Cl. ................ 315/22, 315/24, 315/27 TD, 315/30

[51] Int. Cl. ............................................ H01j 29/70

[58] Field of Search ............. 315/22, 24, 30, 27 TD

[56] References Cited

UNITED STATES PATENTS

| | | | |
|---|---|---|---|
| 3,646,393 | 2/1972 | Tarr | 315/27 TD |
| 3,678,191 | 7/1972 | Peters et al. | 315/30 X |
| 3,708,716 | 1/1973 | Berwin | 315/30 |
| 3,403,288 | 9/1968 | Bradley et al. | 315/30 X |
| 3,403,291 | 9/1968 | Lazarchick, Jr. et al. | 315/22 X |
| 3,465,200 | 9/1969 | Higbee et al. | 315/30 |
| 3,473,082 | 10/1969 | Kolodnyckij | 315/22 X |

*Primary Examiner*—Carl D. Quarforth
*Assistant Examiner*—P. A. Nelson
*Attorney*—Edward J. Norton

[57] ABSTRACT

An intensity control circuit is utilized in conjunction with a cathode ray tube (CRT) display wherein the grid-to-cathode drive to the CRT is automatically adjusted to compensate for changes in scan velocity or scan repetition rate in order to maintain a constant trace brightness. The circuit monitors the duty cycle of the CRT trace and provides a peak drive voltage which is the non-linear inverse of the duty cycle, further modified to account for the non-linear grid beam current characteristic of cathode ray tubes.

2 Claims, 5 Drawing Figures

INVENTOR.
Thomas J. Brady
BY J D Lazar
ATTORNEY

INVENTOR.
Thomas J. Brady
BY J D Lazar
ATTORNEY

CATHODE RAY DISPLAY INTENSITY CONTROL CIRCUIT

The invention herein described was made in the course of or under a contract or subcontract thereunder with the Department of the Air Force.

BACKGROUND OF THE INVENTION

Cathode ray tube displays must generally operate under conditions where the dwell of the beam at any one spot on the face is a variable, depending upon the line length scanned in a given time, or conversely the time allocated to scan a given length, and the number of times the particular line is scanned out of a given longer interval such as one second, or the decay time of the CRT phosphor. The brightness of the resulting image is a direct function of the dwell time of the beam at any one spot, therefore, the brightness will vary with these operating conditions. This variation may be from a barely discernable image to a brilliant image which may burn the CRT face.

A typical example is the cathode ray oscilloscope when employed to observe waveforms at various points in a piece of electronic equipment. The scan time for a trace is generally adjusted by the user to allow him to view the portion of the waveform which is of interest in the greatest detail. The repetition rate of the CRT scan is generally controlled by the repetition rate of the waveform being observed, which may bear no direct relation to the CRT scan velocity selected by the user, resulting in brightness variations if not compensated for.

Another example is the radar A-scope and similar displays wherein the scan time for the trace is adjusted by the operator to encompass the radar range to be observed. The repetition rate of the scan is related to the repetition rate of the radar, which may be established by other system requirements not governed by the radar range being observed. This again results in a variable duty cycle which will cause brightness variations, if uncompensated, of as much as 150 to 1 or more.

Control circuits hitherto provided for automatic control of brightness for specific types of displays only. In TV or raster type displays, the time, length and repetition rate of scan is constant, therefore brightness control requires only fixed adjustment. Graphic display systems using cathode ray tubes are generally computer controlled and either the time and repetition rate of a given length line segment is constant or precisely specified and the computer calculates the compensation required using the CRT grid drive/beam current characteristics stored in the computer memory.

Some systems differentiate the scan voltage or current waveform by various means and derive a CRT grid drive based on the velocity of the scan, but not taking into account the rate of repetition. In addition, many systems do not take into account non-linear CRT grid voltage/beam current characteristic.

In many situations using CRT's where the duty cycle may vary 150 to 1 or more such as with oscilloscopes and radars as noted above, it is difficult to provide both the correction for duty cycle and to compensate for the non-linear CRT/grid characteristic with simple circuits in a predictable manner.

SUMMARY OF THE INVENTION

According to the present invention the duty cycle of the CRT trace is determined by sampling the on-to-off ratio of the unblanking voltage applied to the CRT. The magnitude of the unblanking voltage is controlled in accordance with the duty cycle and grid characteristic of the CRT to cause the brightness of the trace to remain sensibly constant with the changes in the duty cycle.

DESCRIPTION OF A PREFERRED EMBODIMENT

Figure 1:
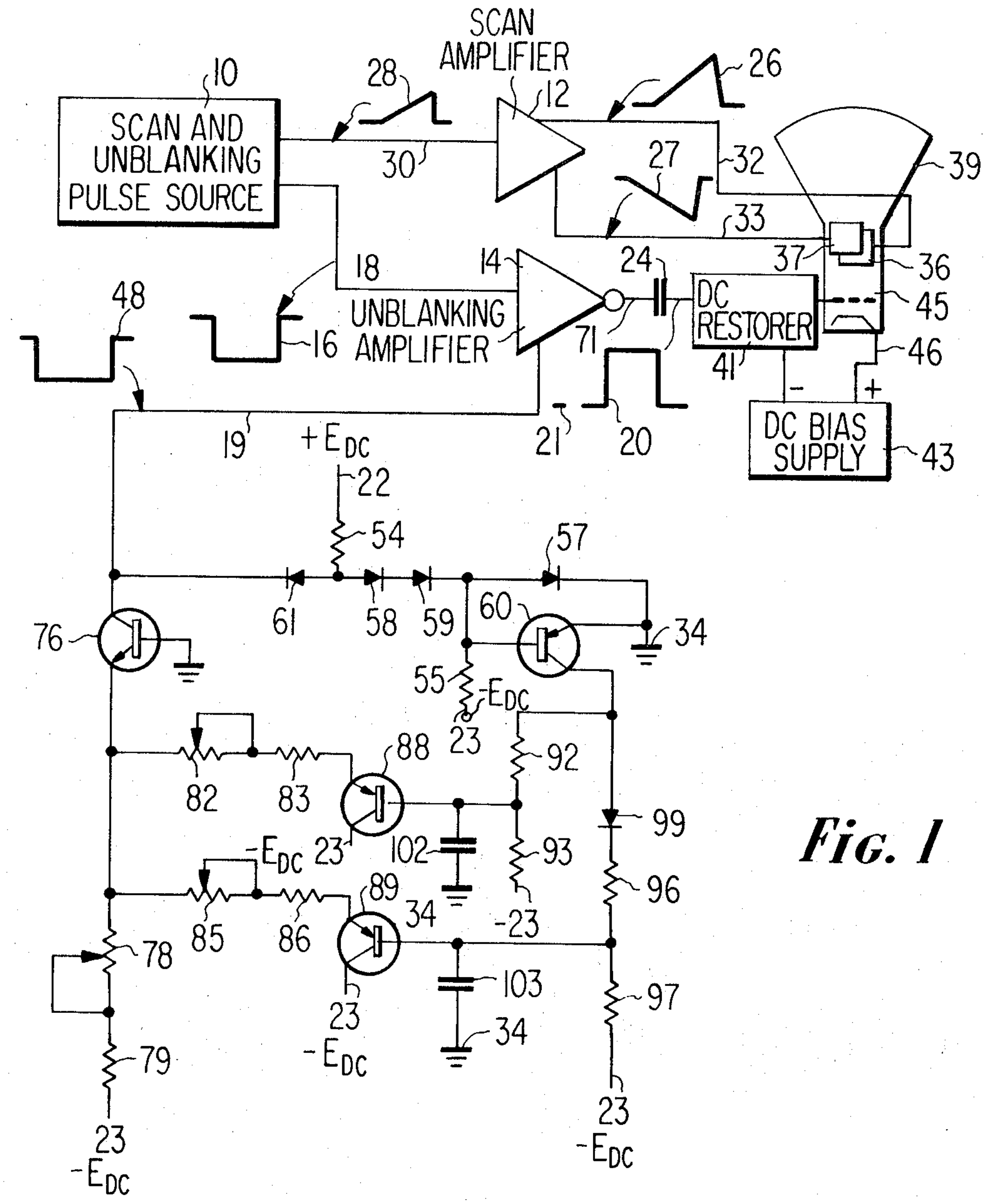
FIG. 1 is a schematic diagram of the cathode ray tube intensity control according to the invention, shown connected to a typical CRT display system.

Referring to FIG. 1, a CRT display system comprises a cathode ray tube 39 with the usual deflection elements for controlling the position of the beam, of which one pair 36 and 37 are shown, a cathode 46 for emission of the beam and at least one grid 45 for controlling the beam current. It is to be noted that a magnetically deflected CRT containing a cathode and grid may be also used. The system includes a pulse and scan source 10, a scan amplifier 12 and an and an unblanking gate amplifier 14. The pulse source 10 may be free running, or may be triggered by a control signal as is done in a radar or laboratory oscilloscope, and may include multivibrators, integrators or other circuits well known in the art. The scan amplifier 12 is typically either a voltage amplifier for use with electrostatically deflected CRT's as shown in FIG. 1, or may be a current amplifier as would be the case with magnetically deflected CRT's both of which are well known in the art.

Figure 2:
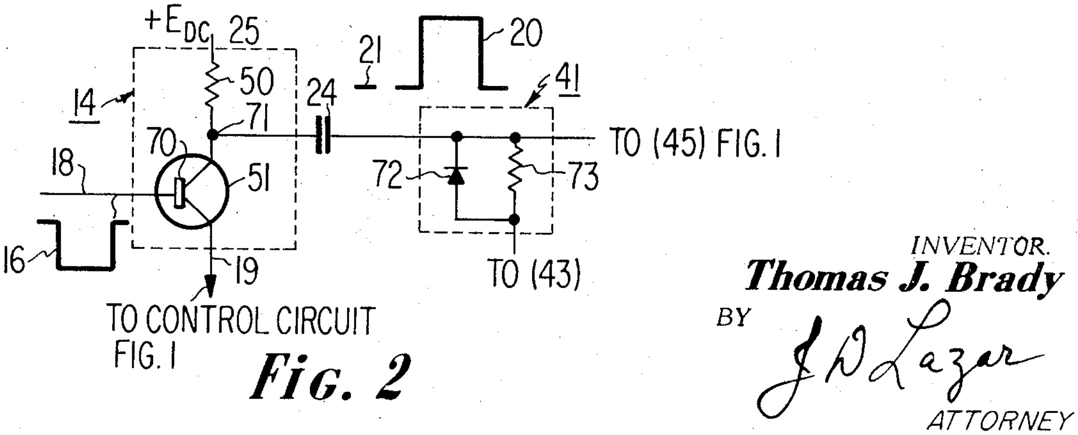
FIG. 2 is a schematic diagram of a preferred form of the unblanking amplifier 14 and DC restorer 41 illustrated in FIG. 1.

Referring to FIG. 2, the unblanking amplifier 14 may consist of but is not limited to a common emitter transistor stage 51 with the unblanking gate 16 from the source 10 applied to the control electrode 70, the base, via conductor 18. When the gate waveform 16 is positive, the amplifier is turned on and the current flow through it causes a voltage drop in the load resistor 50. During the unblanking interval, the waveform 16 becomes negative, turning the amplifier stage 51 off, and since there is now no current through the load resistor, the output 71 of the stage rises to the supply voltage 25 resulting in the unblanking waveform 20 which is applied to the CRT grid 45 via the capacitor 24 and DC restorer 41. A vacuum tube may be substituted for the transistor 51, with appropriate change in element terminology, as known in the art.

A negative DC bias voltage sufficient to keep the CRT turned off is applied to its grid from the bias power supply 43 through the DC restorer 41. The unblanking output wave form 20 from the amplifier is clamped at its baseline or most negative excursion 21 by the diode 72. When the waveform 20 goes positive, the voltage applied to the CRT grid will be more positive than the CRT beam cutoff bias from the DC Bias Supply, and the beam will be turned on. The beam current and thereby the display trace brightness will be controlled by the amount that the waveform 20 rises above the cutoff bias voltage, which in turn is the peak to peak excursion of the waveform 20 as it appears across the load resistor 50. Since the maximum positive excursion of the waveform as it exists across the load resistor 50 is fixed at the +DC supply voltage 25, the peak-to-peak excursion may be controlled by varying the voltage drop across the load resistor via control of the amount of current flow through the amplifier 51 when the input 16 to the amplifier is positive and the amplifier is on.

According to the present invention, an automatic adjustment is made of the current passing through the amplifier 51 as a function of the on-to-off time duty cycle of the CRT. The on-time of the CRT corresponds with the off time of the amplifier.

A sufficient input amplitude is applied to the amplifier from the unblanking gate source 10 to turn the amplifier fully off or fully on. The amount of current flow through the amplifier is essentially equal to the current supplied to the emitter of the amplifier from the control circuit to be described, via conductor 19. It is to be noted that in a conventional prior art CRT display circuit, the unblanking amplifier 14 would have its transistor 51 emitter grounded or connected to a manually adjustable potentiometer to set thereby the operating intensity level of the CRT.

Referring to FIG, 1, the control circuit consists of the three PNP transistors, 60, 88, and 89, and the NPN transistor 76 with the various passive elements required to establish their operating mode as will be described in greater detail. The transistor 76 is arranged in a common base connection with the base grounded, and the collector connected to the unblanking amplifier 14 via conductor 19. Collector current from transistor 76 provides the controlled current supplied to the emitter of transistor 51 of the unblanking amplifier 14 via conductor 19.

An array of diodes 57, 58, 59, and 61 and resistors 54 and 55 are arranged to provide a control voltage to the transistor 60 depending upon the voltage appearing in conductor 19 by emitter follower action of the unblanking amplifier stage 51. The transistor 60 obtains its base voltage via resistor 55 from the negative supply voltage 23. The collector of transistor 60 is connected to resistors 92 and 93 in series to the negative supply voltage 23. The common point of the resistors 92 and 93 are connected to the 88 transistor via its base and includes a capacitor 102 bypassing it to ground. The emitter of transistor 88 is connected to the emitter of 76 via fixed resistor 83 and variable resistor 82. The collector of transistor 60 is also connected to the diode 99 and resistors 96 and 97 in series to the negative supply voltage 23. The common point of the resistors 96 and 97 are connected to the 89 transistor via its base and includes a capacitor 103 shunting it to ground. The emitter of transistor 89 is connected to the emitter of 76 via fixed resistor 86 and variable resistor 85. The emitter of transistor 76 is also connected via the fixed resistor 79 and variable resistor 78 to the negative supply 23. The collectors of the transistors 88 and 89 are furnished power from the negative supply 23.

In operation, when the CRT is blanked, the amplifier 14 is on with a positive voltage level applied to its input via conductor 18, causing a positive voltage level to appear on conductor 19 as the baseline of the waveform 48 by emitter follower action of 51. The diode 61 is reversed-or-back-biased to a nonconducting state. Resistor 54 through the diodes 58 and 59 provides a current which opposes or bucks-out the current passing through the resistor 55, thereby turning-off the transistor 60. The capacitor 102 with transistor 60 nonconducting, is charged toward the value of the voltage at terminal 23 through the resistor 93.

When the CRT is on or operating, which is the condition of being unblanked, the amplifier 14 is off and current from the transistor 76 collector is diverted through 61 to 54 causing a voltage drop across resistor 54. In this condition the current through the resistor 54 no longer balances out the current through the resistor 55 and the current through resistor 55 thereby turns on the transistor 60. The diodes 58 and 59 provide a small voltage drop to compensate for the voltage between the base and emitter $V_{be}$ of the transistor 60 required to turn it on.

With the transistor 60 now on or operating, representing the time during which the CRT beam is also on, the capacitor 102 discharges toward ground 34 through the resistor 92 and through the transistor 60. The net voltage stored on the capacitor 102 is therefore dependent upon the percentage of time that the CRT is on or unblanked, which is the time during which the amplifier 14 is off and the transistor 60 is on. The voltage on the capacitor 102 with respect to ground, as a function of the several parameters of the circuit, may be expressed in accordance with the following equation:

$$V = [(-E_{DC})\ (R1)]/(R1 + nR2) \qquad (1)$$

where $V$ is the voltage on the capacitor 102, $E_{DC}$ is the voltage of the supply voltage 23; R1 and R2 are the numerical values in ohms respectively of the resistor 92 and 93; and n is the duty cycle or the percent of on-time of the CRT beam expressed as a decimal with unity as a maximum.

It is clear from the above equation that as the duty cycle is increased, such as would occur if the display oscilloscope scan velocity or repetition rate were increased, the voltage across the capacitor 102 would be reduced. This voltage on the capacitor is applied to the base of the emitter follower transistor 88, whose collector is connected to the negative power supply. The emitter of the transistor 88 applies the voltage appearing on the capacitor 102 across the resistors 82 and 83 by emitter follower action, less the insignificant $V_{be}$ drops across the transistors 88 and 76. The current through the resistors 82 and 83 is then proportional to the voltage appearing on the capacitor 102 which a non-linear inverse function of the on-time duty cycle of the CRT, defined by the above equation (1).

The current through the resistors 82 and 83 is applied as the emitter current to the transistor 76 and appears as the collector current of transistor 76 at substantially the same value diminished only by the gain parameter $\alpha$ (alpha) of the transistor which is close to unity.

The collector current of 76 is the current which ultimately appears as a current through the resistor 50 via the amplifier stage 51 and thus controls the peak-to-peak voltage output amplitude of the amplifier 14. The resistor 82 is arranged to provide an adjustment of the contribution of the voltage appearing on the capacitor 102 to the unblanking pulse voltage amplitude developed on the conductor 71, while the resistor 83 limits the maximum current flowing through the transistors 76 and 88, and resistors 82 and 83 to avoid burnout of the components.

DC Bias Supply 43 usually provides a voltage greater than that necessary to cutoff the average CRT in order to accommodate the normal tolerance in the cutoff voltage required by some CRT's. Resistors 78 and 79 provide an initial constant, but adjustable, current source to 14 via 76 to establish the threshold of illumination of the CRT. There is also a minimum limit to the current contribution by the transistor 88 through the resistors 82 and 83, since at maximum duty cycles, the voltage on the capacitor 102 does not go to zero. The setting of the resistor 78 allows for taking into account the maximum duty cycle contribution of 82, 83, and 88 to the initial constant current required to establish the CRT illumination threshold.

One network comprising the transistor 88, capacitor 102, and the resistors 82, 83, 92 and 93 provides a first approximation to the non-linear unblanking pulse amplitude vs. duty cycle relationship required, which is satisfactory over a medium range of duty cycles. A second duty cycle dependent network composed of the transistor 89, resistors 85, 86, 96, 97, and capacitor 103 may be added as shown in FIG. 1, to provide a fit to the CRT unblanking amplitude vs. duty cycle characteristic over a wider range of duty cycles. More such networks may be added to accommodate very wide duty cycle ranges. Each additional network must have different values for the resistors corresponding to R1 and R2 in the above equation and those corresponding to resistors 82 and 83 in FIG. 1 so as to be effective over different duty cycle ranges.

It has been found, also, that diodes such as 99 must be used with each additional network added, to prevent discharge of one capacitor such as 102 into the next network capacitor such as 103. For each additional network comprising a transistor such as 89 and its associated resistors, an additional diode such as 99 is needed. Such a diode, however, is not needed for the first network where the ratio of the values of the resistances representing R1/R2 is the greatest.

The diode 57 clamps the excess current through the resistor 54 as compared to the current through the resistor 55 when the voltage on the conductor 19 is high, thereby preventing excessive reverse bias on transistor 60 and further causing the diode 61 to turn off so that the resistor 54 does not cause some of the controlled current to be shunted away from the amplifier 14.

In a typical embodiment of this invention, the following values were used for the components of the control circuit portion of FIG. 1:

| Items | Value or type |
|---|---|
| 54 | 6800 ohms |
| 55 | 10,000 ohms |
| 57,61,99 | 1N3600 diode |
| 60,88,89 | 2N2905A transistor [The transistor arrangement known in the art as the Darlington connection may be used for 88 or 89 to reduce any effect transistor base current may have on resistor 92, 93, or 96, 97 networks.] |
| 76 | 2N2219A transistor |
| 78 | 2500 ohms adjustable |
| 79 | 560 ohms |
| 82 | 100,000 ohms adjustable |
| 83 | 4640 ohms |
| 85 | 5000 ohms adjustable |
| 86 | 560 ohms |
| 92 | 1960 ohms |
| 93 | 10,000 ohms |
| 96 | 316 ohms |
| 97 | 100,000 ohms |
| 22 | +25 V.D.C. power |
| 23 | –25 V.D.C. power |
| 102, 103 | 10 microfarads |
| 58, 59 | 1N3600 diode [Where the peak voltage of waveform 48 is of sufficient magnitude, a resistor or Zener diode of appropriate value may be substituted for 58 and 59.] |

These values are for use with an 5AFP-1 type cathode ray tube.

Figures 3, 4, 5:
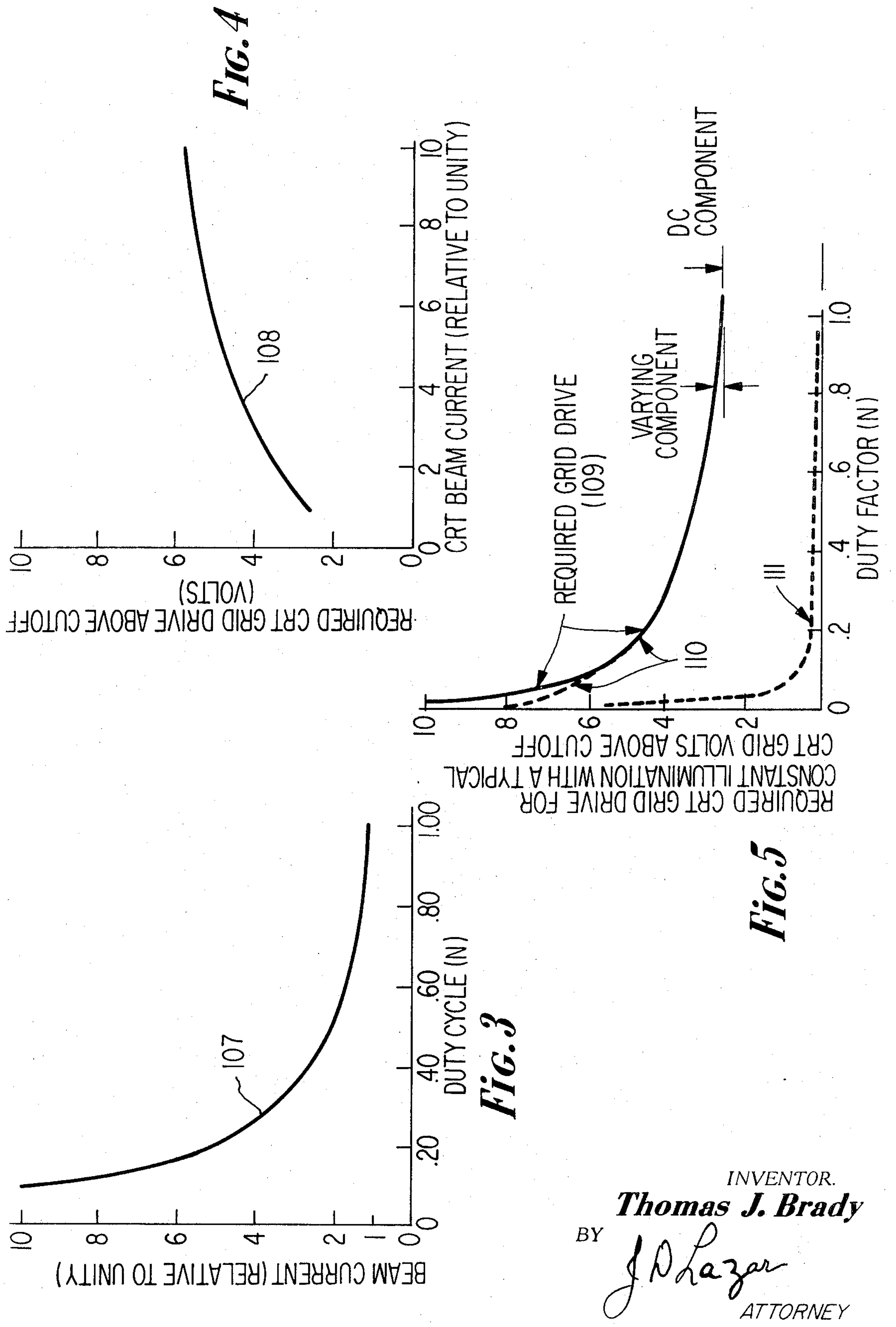
FIG. 3 is a curve plot of the duty cycle vs. the beam current illustrating the change in beam current required to maintain constant illumination with changing duty cycles.
FIG. 4 is a curve plot showing the CRT grid drive required for a given beam current.
FIG. 5 is a curve plot to show both the required and actual grid drive for constant illumination of the CRT with varying duty cycles.

FIG. 3 particularly illustrates the non-linear inverse change in beam current required to maintain a constant brightness as the duty cycle of a CRT scan is reduced, relative to the current at 100 percent (unity) duty cycle. The grid drive required for a typical CRT to obtain various beam currents is seen to also be a non-linear function, in FIG. 4. Combining the curves of FIG. 3 with that of FIG. 4 results in the solid curve 109 of FIG. 5, which is the grid drive required for a typical CRT, to maintain constant trace illumination under varying scan duty cycles. This grid drive consists of a DC component to set the basic, high duty cycle brightness and a non-linearly varying component to account for the duty cycle variations.

The control circuit provides an adjustable DC component through the effect of resistors 78 and 79, and from the fact that at and near 100 percent duty cycles, the capacitors 102 and 103 are not fully discharged to ground because of the voltage divider action of the resistor groups 92,93, and 96,97. The voltage of the DC Bias Supply 43 is sufficient to insure a cutoff bias for the CRT in the blanked state and to place the threshold bias within the range of adjustment of the resistor 78. DC Bias Supply 43, may be a power supply, or a tap on the CRT high voltage divider, or a Zener or gas tube regulator in the CRT voltage divider.

The ratio of the resistors 92 and 93, and 96 and 97, which correspond to R1 and R2 of the equation (1), and the values of resistors 82, 83, 85 and 86 are found by the known procedures in the art termed "curve fitting." Thus, the required CRT grid drive characteristic is plotted in a manner similar to the solid-line curve 109 of FIG. 5. Equation (1) is plotted with an ($-E_{DC}$) voltage, and R1, R2 ratio initially arbitrarily selected to make the curve plot to the same general scale as the required CRT drive curve plot 109. A number of different ratios of R1 to R2 are plotted, and the resulting family of curves of equation (1) are compared in shape with the required grid drive curve. In this particular embodiment, the curve 110 with an R1–R2 ratio of five, was a close match to the required curve 109, when the effective ($-E_{DC}$) was corrected to superimpose the two curves, which is done by adjusting the resistors 82 and 78 in the actual circuit.

At the lower duty cycles, i.e. 0.4 and below, the correction curve of equation (1) may deviate from the required CRT grid drive plot. As previously described a second network, 85, 86, 89, 96, 97, 99 and 102 is added to provide correction at low duty cycles. This is done by curve fitting to the difference between the drive required and that obtained from one network, resulting in the dashed line curve 111. In this particular embodiment, an R1–R2 ratio of 300 provided the additional correction, so that the entire circuit is capable of accommodating duty cycle variations of 150 to 1. The effect of 111 is added to 110 to obtain the fit to curve 109.

Capacitors 102 and 103 are selected so as to maintain a substantially constant voltage over the time of the longest scan.

It is thus clear that the intensity of the cathode ray tube display is maintained at a relatively constant brightness under conditions of varying trace duration repetition rates and duty cycle.

It will be appreciated that this invention may be used in computer terminal displays where refresh rates are not constant, instrumentation oscilloscopes where the observed phenomenon dictate the sweep scan times and rates, storage tubes where a constant integrated beam current per point is required to insure storage, and alpha-numeric indicators.

What is claimed is:

1. A dynamic intensity control circuit for use in a display system employing a cathode ray tube having means producing an electron beam, a screen on which the beam impinges, means for deflecting the beam across said screen to produce a visible trace, a grid for controlling the intensity of the beam, and an input signal for providing a control signal to said grid, comprising, a. means responsive to said input signal coupled to said grid for generating an unblanking voltage of variable amplitude whereby said beam impinges on said screen with an intensity proportional to the amplitude of said unblanking voltage, said unblanking voltage having an on-to-off time in response to said input signal, b. means for sampling duration of on-to-off time of said unblanking voltage, and c. means responsive to said sampled unblanking voltage for varying the amplitude of said unblanking voltage in proportion to the on-to-off time of the unblanking voltage to vary the intensity of said beam whereby the brightness of said beam is maintained substantially constant, d. said amplitude varying means including a network having a capacitor coupled to said unblanking voltage generating means arranged to be charged with a voltage in proportion to the sampling duration of on-to-off time, and a path in said network for discharging said capacitor through biasing means coupled to said unblanking voltage generating means for varying the amplitude of said unblanking voltage in proportion to said sampled duration, e. said network including a resistance network for a charge path and a discharge path of said capacitor, said charge path comprising a resistor of value $R_1$ ohms and said discharge path comprising a resistor of value $R_2$ ohms, the voltage on said capacitor being proportional to the ratio $R_1/(R_1 + n R_2)$, where n is the percent of on-time of said unblanking voltage, f. said network further including a fixed resistor and an adjustable resistor in the discharge path of said first mentioned capacitor, the respective resistance values of said resistors being selected so that the capacitor voltage characteristic substantially coincides with the grid-to-cathode characteristic of said cathode ray tube, the value of said fixed resistor being selected to define the maximum unblanking voltage amplitude whereby a constant beam brightness is maintained for varying duty cycles of said unblanking voltage.

2. A control circuit according to claim 1, further comprising a second network having a second capacitor, and a second said resistance network, comprising a charge-path resistor of $R_3$ ohms and discharge-path resistor of $R_4$ ohms, the voltage across said second capacitor being proportional to $R_3/(R_3 + n_1 R_4)$, where $n_1$ is the percent of on-time of said unblanking voltage for a duty cycle relative to the duty cycle defined by $n_1$, $n_1$ being larger than n, means for coupling the discharge path of said second capacitor to the discharge path of said first-mentioned capacitor, and means to decouple the respective charge paths of said capacitors.

* * * * *